United States Patent Office 3,038,009
Patented June 5, 1962

---

3,038,009
N-($\beta,\beta,\beta$-TRINITROETHYL)-4,4,4-TRINITRO-BUTYRAMIDE
Irwin J. Schaffner, Waldwick, N.J., assignor to United States Rubber Company, New York, N.Y., a corporation of New Jersey
No Drawing. Filed July 7, 1950, Ser. No. 172,609
3 Claims. (Cl. 260—561)

This invention relates to a new compound, N-($\beta,\beta,\beta$-trinitroethyl)-4,4,4-trinitrobutyramide, and a method of making it from acrylamide, formaldehyde and trinitromethane. This compound is useful as an explosive and propellant.

The new compound of my invention is N-($\beta,\beta,\beta$-trinitroethyl)-4,4,4-trinitrobutyramide. It is made preferably by reacting acrylamide with formaldehyde in a slightly alkaline solution, neutralizing the alkaline material, and subsequently, without isolation, reacting the intermediate compound N-methylol acrylamide with two molar proportions of trinitromethane per mol of the originally used acrylamide reagent. The acrylamide and formaldehyde are brought together, preferably in equivalent proportions and preferably in a suitable mutual solvent, such as water, containing a small amount of an alkaline material to act as catalyst for the condensation. As such a catalyst there may be used an alkaline or alkaline earth hydroxide or carbonate which brings the pH of the solution above 7. The solution is neutralized after a suitable time, preferably with a weak acid such as carbon dioxide. The intermediate compound, which need not be removed from the neutralized solution, is reacted with trinitromethane, preferably in equivalent proportions; i.e., two mols trinitromethane per mol of the originally used acrylamide reagent. The solution is heated gently for a sufficient time to complete the reaction, and then cooled, causing crystallization of the N-($\beta,\beta,\beta$-trinitroethyl)-4,4,4-trinitrobutyramide. It may be separated conveniently by filtration.

The reactions involved in preparing the compound are illustrated as follows:

(1)

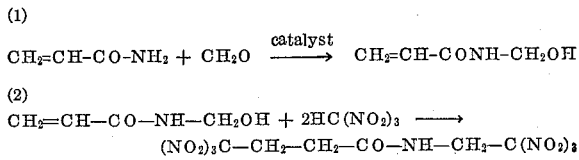

(2)
$CH_2$=CH—CO—NH—$CH_2$OH + 2HC($NO_2$)$_3$ ⟶
    ($NO_2$)$_3$C—$CH_2$—$CH_2$—CO—NH—$CH_2$—C($NO_2$)$_3$

In the following example all parts are by weight.

*Example*

To a saturated solution of barium hydroxide in 10 parts water are added 1.42 parts (0.02 mol) acrylamide and 1.62 parts (0.02 mol) 37% formalin. After a short time the solution is treated with carbon dioxide, and the precipitated barium carbonate filtered. The clear filtrate is then added to a solution of 6.0 parts (0.04 mol) trinitromethane in 12 parts water. Within a short time the mixture becomes cloudy and a few drops of oil separate. The mixture is heated at 70–75° C. for a sufficient time to complete the reaction, and then left at room temperature until the oil solidifies. After decanting the mother liquor the solid is recrystallized twice from a methanol-water mixture, to yield 2.8 parts of N-($\beta,\beta,\beta$-trinitroethyl)-4,4,4-trinitrobutyramide, colorless rosettes melting at 149–51° C. with decomposition. Impact sensitivity: 2.5 kg. hammer—18 cm.

*Analysis.*—Calcd. for $C_6H_7N_7O_{13}$: Carbon 18.7%, Hydrogen 1.8%, Nitrogen 25.5%. Found: Carbon 18.9%, Hydrogen 1.9%, Nitrogen 25.9%.

The compound may also be made by treating acrylamide with trinitromethane, treating the resulting 4,4,4-trinitrobutyramide with formaldehyde and finally condensing the methylol derivative with a second molecule of trinitromethane.

It is worthy of note that the new compound of this invention contains a considerable amount of oxygen and nitrogen in proportion to its carbon and hydrogen content. This high oxygen and nitrogen content is a necessary, but not exclusive, characteristic of most materials which are useful as explosives. The oxygen contents of compounds proposed as explosives are customarily compared in the form of their "oxygen balances," a term defined as $$(O-2C-1/2H)\frac{1600}{MW}$$

where O, C and H are the respective numbers of oxygen, carbon and hydrogen atoms in a compound of molecular weight NW. Typical commercially used exposives have oxygen balances below −100. Compounds with very low negative oxygen balances, or preferably with positive ones, are in great demand as explosives if their other properties are suitable. The oxygen balance of N-($\beta,\beta,\beta$-trinitroethyl)-4,4,4-trinitrobutyramide is −10, thus indicating that it is potentially of great interest as an explosive and/or propellant.

I claim:

1. As a new chemical compound, N-($\beta,\beta,\beta$-trinitroethyl)-4,4,4-trinitrobutyramide.

2. A method of making N-($\beta,\beta,\beta$-trinitroethyl)-4,4,4-trinitrobutyramide which comprises reacting acrylamide with formaldehyde at a pH greater than 7, and subsequently reacting the resulting reaction product with two mols of trinitromethane per mol of said reaction product.

3. A method of making N-($\beta,\beta,\beta$-trinitroethyl)-4,4,4-trinitrobutyramide which comprises reacting acrylamide with one molar equivalent of trinitromethane, subsequently reacting the resulting 4,4,4-trinitrobutyramide with formaldehyde at a pH greater than 7, and subsequently reacting the resulting N-methylol-4,4,4-trinitrobutyramide with a second molar equivalent of trinitromethane.

No references cited.